(12) United States Patent
Senarath et al.

(10) Patent No.: US 9,426,075 B2
(45) Date of Patent: Aug. 23, 2016

(54) METHOD AND SYSTEM TO REPRESENT THE IMPACT OF LOAD VARIATION ON SERVICE OUTAGE OVER MULTIPLE LINKS

(71) Applicant: Huawei Technologies Co., Ltd., Shenzhen (CN)

(72) Inventors: Nimal Gamini Senarath, Ottawa (CA); Aaron James Callard, Ottawa (CA); Ho Ting Cheng, Stittsville (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 17 days.

(21) Appl. No.: 14/203,276

(22) Filed: Mar. 10, 2014

(65) Prior Publication Data

US 2014/0269332 A1 Sep. 18, 2014

Related U.S. Application Data

(60) Provisional application No. 61/778,104, filed on Mar. 12, 2013.

(51) Int. Cl.
*G01R 31/08* (2006.01)
*H04L 12/803* (2013.01)
*H04L 12/729* (2013.01)
(Continued)

(52) U.S. Cl.
CPC ............ *H04L 47/125* (2013.01); *H04L 45/125* (2013.01); *H04L 45/24* (2013.01); *H04W 40/14* (2013.01)

(58) Field of Classification Search
CPC .................................................. H04L 47/125
USPC .......................................................... 370/238
See application file for complete search history.

(56) References Cited

U.S. PATENT DOCUMENTS 5,825,759 A    10/1998  Liu
6,697,333 B1    2/2004  Bawa et al.
6,904,017 B1    6/2005  Meempat et al.
(Continued)

FOREIGN PATENT DOCUMENTS

CA    2350449 A1    12/2002
EP    1302783 A1    4/2003
(Continued)

OTHER PUBLICATIONS

International Search Report received in Application No. PCT/CN2014/073268, mailed Apr. 30, 2014, 14 pages.
Wikipedia, "Asynchronous Transfer Mode" http://en.wikipedia.org/wiki/Asynchronous_Transfer_Mode, retrieved May 6, 2014, 7 Pages.
Chowdhury, M.Z., "Call Admission Control based on Adaptive Bandwidth Allocation for Multi-Class Services in Wireless Networks.", Information and Communication Technology Convergence (ICTC), Nov. 17-19, 2010, pp. 358-361.
(Continued)

*Primary Examiner* — Gerald Smarth
(74) *Attorney, Agent, or Firm* — Slater Matsil, LLP

(57) ABSTRACT

Increased resource utilization efficiency can be improved by modeling path costs during admission and path-selection. Specifically, path costs for candidate paths are modeled based on load characteristics (e.g., current load, load variation, etc.) of links in the candidate paths. Path costs can represent any quantifiable cost or liability associated with transporting a service flow over the corresponding path. For example, path costs can correspond to a probability that at least one link in the path will experience an outage when transporting the service flow, a price charged by a network operator (NTO) for transporting the traffic flow over the candidate path, or a total network cost for transporting the flow over a candidate path. The candidate path having the lowest path cost is selected to transport a service flow.

27 Claims, 9 Drawing Sheets

(51) Int. Cl.
*H04L 12/707* (2013.01)
*H04W 40/14* (2009.01)

(56) References Cited

U.S. PATENT DOCUMENTS

| | | | |
|---|---|---|---|
| 6,934,249 B1* | 8/2005 | Bertin et al. | 370/218 |
| 8,108,554 B1* | 1/2012 | Masters | H04L 41/0659 709/218 |
| 8,369,220 B1* | 2/2013 | Khanna et al. | 370/235 |
| 8,849,183 B2 | 9/2014 | Edge et al. | |
| 2003/0016624 A1* | 1/2003 | Bare | H04L 29/12009 370/217 |
| 2004/0205237 A1* | 10/2004 | Doshi et al. | 709/241 |
| 2006/0083205 A1 | 4/2006 | Buddhikot et al. | |
| 2007/0110034 A1* | 5/2007 | Bennett | H04L 45/00 370/352 |
| 2008/0043709 A1* | 2/2008 | Zhou | H04L 1/0006 370/348 |
| 2008/0267088 A1 | 10/2008 | Dunbar et al. | |
| 2009/0141694 A1 | 6/2009 | Shi | |
| 2009/0191858 A1 | 7/2009 | Calisti et al. | |
| 2009/0232089 A1 | 9/2009 | Lott | |
| 2010/0183025 A1 | 7/2010 | Stephens et al. | |
| 2010/0238835 A1* | 9/2010 | Lundgren | H04L 12/2697 370/253 |
| 2011/0090853 A1 | 4/2011 | Chandramouli et al. | |
| 2011/0096675 A1 | 4/2011 | Li et al. | |
| 2011/0125921 A1 | 5/2011 | Karenos et al. | |
| 2011/0244899 A1 | 10/2011 | Li et al. | |
| 2012/0057456 A1 | 3/2012 | Bogatin et al. | |
| 2012/0087276 A1* | 4/2012 | Huang et al. | 370/253 |
| 2012/0115467 A1 | 5/2012 | Conte et al. | |
| 2012/0289236 A1 | 11/2012 | Xu et al. | |
| 2013/0336118 A1 | 12/2013 | Shaw et al. | |
| 2014/0086065 A1* | 3/2014 | DeCusatis et al. | 370/242 |
| 2014/0140210 A1* | 5/2014 | Liu et al. | 370/233 |
| 2014/0162626 A1 | 6/2014 | Cui et al. | |
| 2014/0185581 A1 | 7/2014 | Senarath et al. | |
| 2014/0219104 A1 | 8/2014 | Senarath et al. | |
| 2015/0032495 A1 | 1/2015 | Senarath et al. | |

FOREIGN PATENT DOCUMENTS

| | | | |
|---|---|---|---|
| EP | 1347603 | A1 | 9/2003 |
| EP | 2237495 | A1 | 10/2010 |
| WO | 2009004661 | A2 | 1/2009 |
| WO | 2012059130 | A1 | 5/2012 |

OTHER PUBLICATIONS

Falkner, M.,"Minimum Cost Traffic Shaping: A Users Perspective on Connection Admission Control." Department of Systems and Computer Engineering, Carleton University, Ottawa, Ontario, Canada 1999, pp. 1-6.

Fitzpatrick, J., "ECHO: A Quality of Service Based Endpoint Centric Handover Scheme for VoIP," IEEE Wireless Communications and Networking Conference, Mar. 31, 2008-Apr. 3, 2008, pp. 2777-2782.

Ge, Y., "Quality of Service Routing in Ad-Hoc Networks Using OLSR." IEEE Proceedings of the 36th Hawaii International Conference on System Sciences, 2003, pp. 1-9.

Notification of Transmittal of the International Search Report and the Written Opinion of the International Searching Authority, or the Declaration received in Application No. PCT/US2013/075480, mailed Apr. 4, 2014, 12 pages.

International Search Report and Written Opinion recieved in Application No. PCT/CN13/75173, mailed Apr. 22, 2014, 11 pages.

International Search Report and Written Opinion received in International Application No. PCT/CN2014/081863 mailed Oct. 14, 2014, 15 pages.

Wikipedia, "Least-Cost Routing", Retrieved Jun. 29, 2015 from https://en.wikipedia.org/wiki/Least-cost_routing, 4 pages.

Wikipedia, "Open Shortest Path First" http://en.wikipedia.org/wiki/Open_Shortest_Path_First, retrieved May 6, 2014, 13 pages.

Rossi, M., "Integrated Cost-Based MAC and Routing Techniques for Hop Count Forwarding in Wireless Sensor Networks." IEEE Transactions on Mobile Computing, Apr. 2007 vol. 6, No. 4, pp. 434-448.

Shaaban, Y., "Cost-based admission control for Internet Commerce QoS enhancement." Electronic Commerce Research and Applications,vol. 8, Issue 3, May-Jun. 2009, pp. 142-159.

Vasu, K., "QoS Aware Fuzzy Rule Based Vertical Handoff Decision Algorithm for Wireless Heterogeneous Networks," 2011 National Conference on Communications (NCC), Jan. 28-30, 2011, pp. 1-5.

Yang, X., et al. "Enhanced Position Assisted Soft Handover Algorithm for UTRA," IEEE VTS 54th Vehicular Technology Conference, vol. 2, Oct. 2001, pp. 567-571.

Ye, F. "A Scalable Solution to Minimum Cost Forwarding in Large Sensor Networks." UCLA Computer Science Department, Los Angeles, CA pp. 304-309.

Extended European Search Report received in European Application No. 14762774.9 dated Dec. 17, 2015, 10 pages.

* cited by examiner

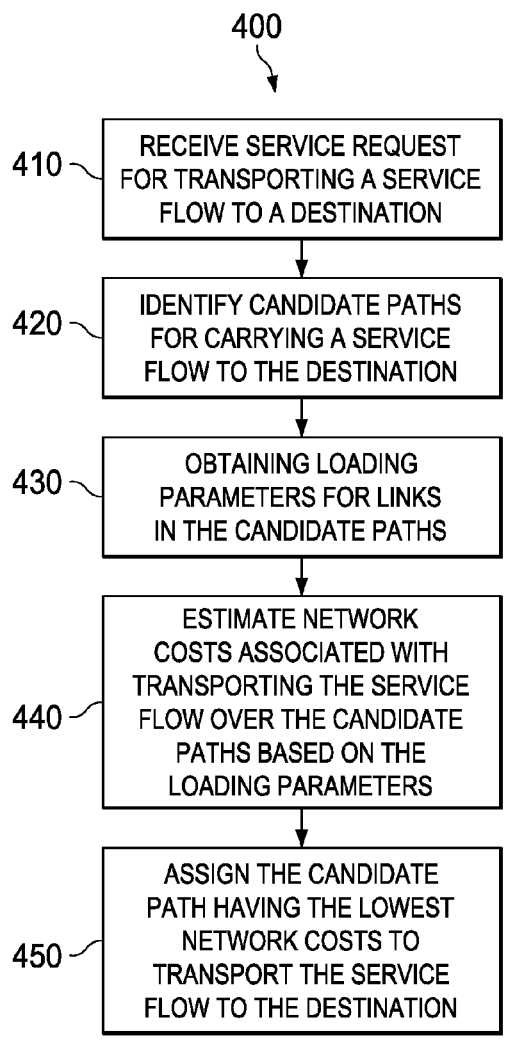
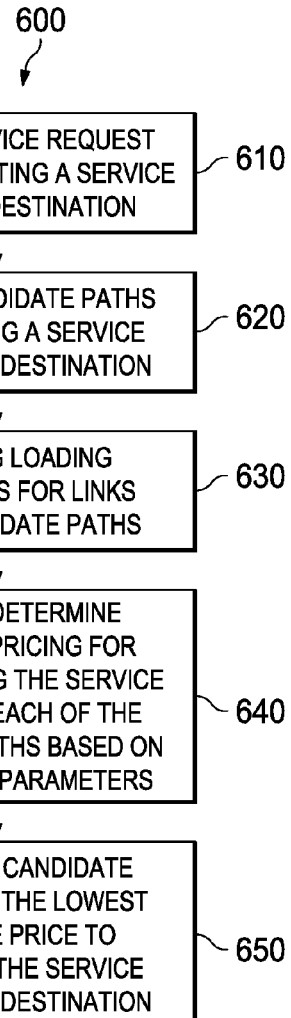
FIG. 4
FIG. 6

US 9,426,075 B2

METHOD AND SYSTEM TO REPRESENT THE IMPACT OF LOAD VARIATION ON SERVICE OUTAGE OVER MULTIPLE LINKS

This patent application claims priority to U.S. Provisional Application No. 61/778,104, filed on Mar. 12, 2013 and entitled "Method and System to Represent the Impact of Load Variation on Service Outage over Multiple Links," which is hereby incorporated by reference herein as if reproduced in its entirety.

TECHNICAL FIELD

The present invention relates to a method and system for network load monitoring, and, in particular embodiments, to techniques for representing the impact of load variation on service outage over multiple links.

BACKGROUND

Network operators are tasked with equitably distributing finite shared resources (e.g., bandwidth, etc.) amongst multiple users in a manner that satisfies the users' collective quality of service (QoS) requirements. Conventional techniques allocate network resources in an ad hoc manner (e.g., on a case-by-case basis), which satisfies QoS requirements at the expense of overall resource utilization efficiency. For example, in wireless environments, spectrum bandwidth may be allocated to satisfy an individual service request without considering how interference resulting from increased traffic load will reduce spectral efficiency over nearby interferences. Accordingly, mechanisms and techniques for more efficiently allocating resources in a network are needed in order to satisfy ever increasing demands of next generation networks.

SUMMARY OF THE INVENTION

Technical advantages are generally achieved, by embodiments of this disclosure which describe techniques for representing the impact of load variation on service outage over multiple links.

In accordance with an embodiment, a method for resource provisioning is provided. In this example, the method includes identifying one or more candidate paths for carrying a service flow to a destination. The one or more candidate paths include at least a first path comprising a first set of links connected in series. The method further includes obtaining load characteristics associated with the first set of links, determining a first cost for carrying the service flow over the first path in accordance with the load characteristics associated with the first set of links, and prompting establishment of the first path when the first cost is less than a threshold. An apparatus for performing this method is also provided.

In accordance with another embodiment, another method for resource provisioning is provided. In this example, the method includes identifying a first path for carrying a service flow to a destination. The first path includes a first set of links managed by one or more network operators. The method further includes dynamically obtaining cost function parameters for links in the first set of links from the one or more network operators, computing a network cost for transporting the service flow over the first path in accordance with cost function parameters; and prompting transportation of the service flow over the first path when the network cost is below a threshold. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawing, in which:

FIG. 4 illustrates a flowchart of an embodiment method for resource provisioning;

FIG. 6 illustrates a flowchart of an embodiment method for resource provisioning;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently disclosed embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Aspects of this disclosure provide a cost-based model for resource allocation that models link/path costs using load characteristics of a network. In one example, a controller identifies one or more candidate paths that are capable of transporting a service flow from a source to a destination. The controller estimates a path cost for transporting the service flow over each candidate path based on dynamically reported load characteristics, e.g., a current load on each link, a load variation on each link, etc. Path cost may represent any quantifiable cost or liability associated with transporting the service flow over the corresponding path. In one embodiment, the path cost corresponds to a probability that at least one link in the path will experience an outage when transporting the service flow. In another embodiment, the path cost corresponds to price charged by a network operator (NTO) for transporting the traffic flow over the candidate path. In yet another embodiment, the path cost corresponds to a total network cost for transporting the service flow over the candidate path. The total network cost may include various direct cost components and indirect cost components. The direct cost component(s) correspond to costs borne by links in the candidate path, while the indirect cost component(s) correspond to costs borne by other links/interfaces (e.g., links excluded from the candidate path) as a result of transporting the service flow over the candidate path. For example, in the context of wireless networks, the total network cost may include a direct component corresponding to the bandwidth needed to transport the flow over the candidate interface, as well as an indirect cost component corresponding to interference experienced on neighboring radio interferences as a result of transporting the flow over the candidate interface. Cost functions used for estimating the path costs may be developed by analyzing historical network data (e.g., interference, throughput, loading, etc.) to obtain correlations between costs and loading on the various links in the network. Network costs may also include energy costs for activating otherwise de-activated links along a candidate path. These and others aspects are described in greater detail below.

Figure 1:
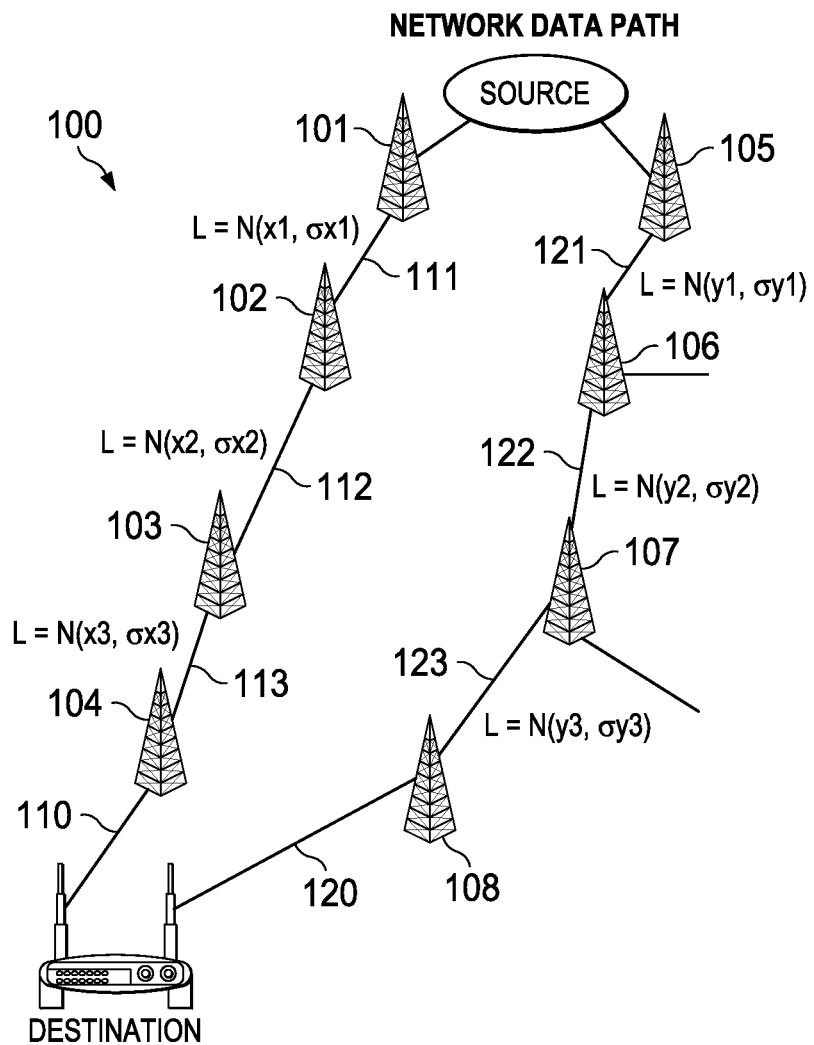
FIG. 1 illustrates a diagram of an embodiment network.

Embodiments of this disclosure provide techniques for estimating path costs based on dynamically reported load parameters, e.g., current load level, load variation, etc. These techniques may be used to increase provisioning efficiency during, inter alia, admission and path selection. Path costs may correspond to outage probabilities (or alternatively, to success probabilities) for transporting a service flow over candidate paths. FIG. 1 illustrates a network 100 in which outage probabilities are estimated for a first path 110 and a second path 120 extending from a source to a destination. The path 110 includes links 111, 112, and 113, where link 111 extends from node 101 to node 102 and is associated with a current load (x1) and a load variation (σx1), link 112 extends from node 102 to node 103 and is associated with a current load (x2) and a load variation (σx2), and link 113 extends from node 103 to node 104 and is associated with a current load (x3) and a load variation (σx3). The path 120 includes links 121, 122, and 123, where link 121 extends from node 105 to node 106 and is associated with a current load (y1) and a load variation (σy1), link 122 extends from node 106 to node 107 and is associated with a current load (y2) and a load variation (σy1), and link 123 extends from node 107 to node 108 and is associated with a current load (y3) and a load variation (σy3).

The current load values (xn, yn) correspond to an instantaneous load on the respective link, while the load variations (σxn, σyn) correspond to a load variation on the link. Load variations may correspond to a function (e.g., distribution, etc.) representing the average load fluctuation (e.g., median, mean, etc.) on the link over an interval, and may correspond to the relative stability of loading on the link. By way of example, links having high load variations may experience relatively higher load fluctuations than links having low load variations. The load parameters may be reported dynamically to a network operator, where they can be used to project outage probabilities for the links 111-113 and 121-123 of the paths 110 and 120 (respectively). For example, if it is assumed that a load parameter ($L_n$) is a random variable having a mean ($u_i$) equal to the current load value, and a variance ($\sigma^2$) equal to the load variation squared, then the outage probability ($\alpha_i$) for a given link can be expressed as $\alpha_i = P(X_i > T)$, where T is the maximum load on the link. Accordingly, the outage probabilities for each link in the path can be summed (directly or using a linear function) to determine the total cost of the path. As a result, the cost function can be modified to determine a cost increase as an increased outage probability as a result of transporting the traffic flow over the path.

Notably, if it is assumed that a single link failure will lead to a total path failure, then the probability of success (e.g., the inverse of the outage probability) over multiple serially links can be expressed as follows: $Ps = \pi(Psi) = \pi(1-Poi)$, where Poi is the probability of outage on a given link (i), Psi is the probability of success (i.e., no outage) on the given link (i). Moreover, if the load variation is assumed to be a normal distribution with a mean ($L_i$) and standard deviation ($\sigma_i$), then the probability of outage can be expressed as follows: $Poi = 0.5 - 0.5 * erf(1-L_i)/(\sigma_i * sqrt(2))$. Additionally, cost can be taken as being inversely proportional to the probability of success, where $cost = log(1/Ps) = -log(Ps) = -log(\pi(1-Poi)) = \Sigma -log((1-Poi))$. If it is assumed that the link cost function is $C(L_i, \sigma_i) = -log((1-Poi))$, then the total cost can be expressed as the sum of the link costs, which may be expressed as $cost = \Sigma C(L_i, \sigma_i)$.

Figure 2:
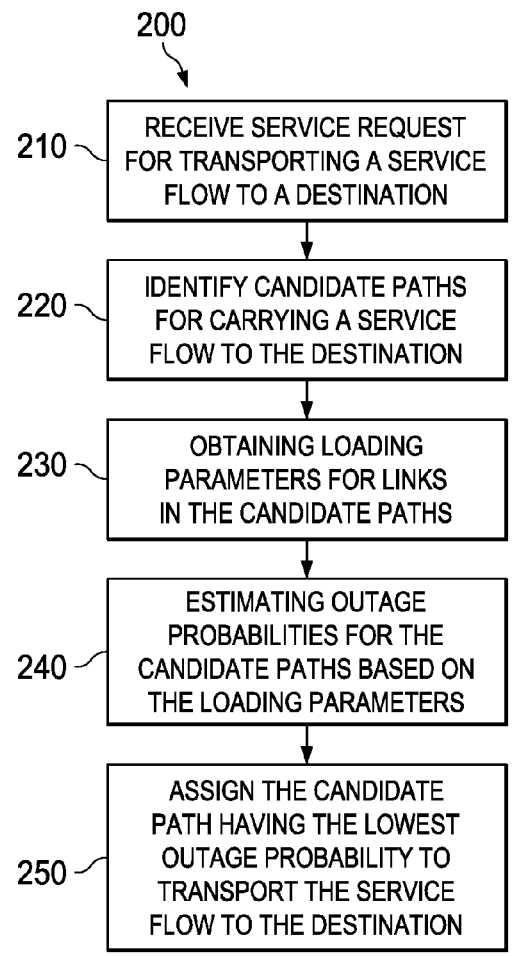
FIG. 2 illustrates a flowchart of an embodiment method for resource provisioning.

Aspects of this disclosure provide methods for predicting outage probabilities during path selection and/or user admission. FIG. 2 illustrates an embodiment method 200 for predicting outage probability during admission/path-selection, as might be performed by a controller. As shown, the method 200 begins with step 210, where the controller receives a service request requesting resources for transporting a service flow to a destination. Thereafter, the method 200 proceeds to step 220, where the controller identifies candidate paths for carrying the service flow to the destination. The candidate paths may each include a series of links capable of transporting the service flow from a source to a destination, and may include wireline interfaces, wireless interfaces, or combinations thereof. Subsequently, the method 200 proceeds to step 230, where the controller obtains loading parameters for links in the candidate paths. The loading parameters may include any characteristic or value corresponding to loading on a link. In one example, the loading parameters include a current load and a load variation. Next, the method 200 proceeds to step 240, where the controller estimates outage probabilities for the candidate paths based on the loading parameters. An outage probability may correspond to a likelihood that at least one link in a corresponding path will fail (e.g., links' maximum capacity exceeded, etc.) if the traffic flow is transported over the path. Thereafter, the method 200 proceeds to step 250, where the controller assigns the candidate path having the lowest outage probability to transport the service flow. In some embodiments, the service request may be rejected altogether if all outage probabilities exceed a threshold.

Figure 3:
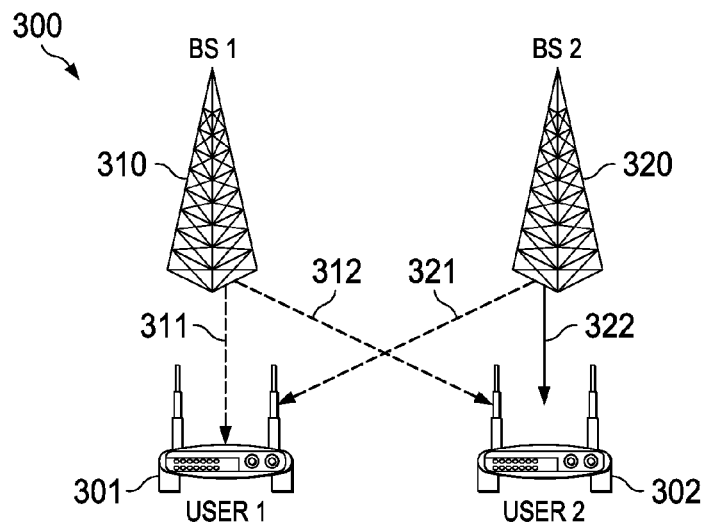
FIG. 3 illustrates a diagram of another embodiment network.

Path costs may also correspond to network costs related to transporting a service flow over candidate paths. The network costs may have direct and indirect cost components. By way of example, network costs in a wireless network may include a direct component corresponding to resources of the candidate interface needed to transport the flow, as well as an indirect cost component corresponding to interference on neighboring interferences. FIG. 3 illustrates a wireless network 300 in which direct and indirect costs are shown for a candidate link. As shown, the network 300 includes access points 310, 320 and users 301, 302. The user 302 is connected to the access point 320 via an interface 322, and the user 301 has submitted a service request requesting transportation of a service flow. Either of the candidate links 311, 321 are capable of transporting the service flow to the user 302. Network costs for transporting the traffic flow over the candidate interface 311 may include a direct cost component corresponding to network resources needed to transport the service flow over the candidate interface 311, as well as an indirect cost component corresponding to a reduction in capacity on the link 322 due to interference 312 resulting from transportation of the service flow over the candidate interface 311. There may be similar direct and indirect costs for the candidate interface 321, and the candidate interface 311, 321 having the lower total cost (e.g., weighted sum of direct and indirect cost components) may be selected to transport the service flow to the user 302.

In some embodiments, indirect cost components may include interference cost components that vary based on a loading of the neighboring links, as neighboring links having higher traffic loading may experience comparatively greater interference costs. For example, adding a new service flow to the candidate interface 311 may include an indirect cost component (e.g., corresponding to a reduction in capacity on the link 322) that varies based on a loading of the link 322. Moreover, interference costs may also depend on the location of impacted receiver(s) (e.g., receivers receiving traffic over the neighboring link) and the average amount of traffic communicated to each impacted receiver over the corresponding neighboring link. For example, adding a new service flow to the candidate interface 311 may include an indirect cost component (e.g., a reduction in capacity on the link 322) that depends on a relative location of the user 302 as well as an amount of traffic communicated to the user 302 via the link 322. These cost factors can be integrated into the link cost formation in various ways. In one example, the controller assigned to the neighbor links can dynamically update the interference cost component values as the receiver location (e.g., loading distribution) and/or the traffic loading associated with the neighboring links (e.g., loading) varies. In another example, interference cost components associated with a new flow can be modeled as a function of load and/or load-distribution on the neighbor links, e.g. the cost function of a link is evaluated as a function of its own loading/load-distribution and the loading/load-distributions of neighboring links.

The following example demonstrates how cost components can be modeled for two neighboring wireless links Let L1 and L2 are the loading of each link and cost functions (as a function of individual node load or 'self load') are f1(L1) and f2(L2) respectively. When L1 is increased by ΔL1, the interference to the second link increases which results in increased resource usage in the second link. This means the loading of the second link is increased by ΔL2 which in turn increases the cost to the second link. It can measure this increased cost by its cost function, f2( ). This can then be informed to the first link to adjust its final cost function value at L1+ΔL1, F1(L1+ΔL1, L2)='cost due to self load'+'cost to neighbour'. This may be repeated for various values of L1 and L2 and ΔL1 values. Once the function F1( ) is obtained, the cost of a link can be obtained taking the impact to the neighbor as a function of self load and the neighbor load, and the neighbor's load can be updated dynamically. The above example considers the neighboring link's load as a single entity. However, this can be obtained for different neighbor load distributions if multiple receivers are involved and the modifications could be done in a similar manner by repeating the above described steps for different neighbor load distributions. In one example, path cost may be computed in accordance with the following formula: $cost = \sum_{i=1}^{n} C(L_i, \sigma_i, L_{i1}, \sigma_{i1}, L_{i2}, \sigma_{i2}, .. L_{im}, \sigma_{im})$, where $C(L_i, \sigma_i)$ is the cost function for the path, $L_i$ is a loading parameter on an $i^{th}$ link in the path, $\sigma_i$ is the load variation on the $i^{th}$ link, $L_{ij}$ is a loading parameter of the $j^{th}$ neighbor of the $i^{th}$ link, $\sigma_{ij}$ is the load variation of the $j^{th}$ neighbor of the $i^{th}$ link, n is the number of links in the path, and m is the number of neighbors for the $i^{th}$ link. In some embodiments, a loading parameter corresponds to a mean or average load. In other embodiments, loading parameters correspond to different loading characteristics, e.g., instantaneous load, median load, etc.

Aspects of this disclosure provide methods for predicting network costs during path selection and/or user admission. FIG. 4 illustrates an embodiment method 400 for predicting network costs during admission/path-selection, as might be performed by a controller. As shown, the method 400 begins with step 410, where the controller receives a service request requesting resources for transporting a service flow to a destination. Thereafter, the method 400 proceeds to step 420, where the controller identifies candidate paths for carrying the service flow to the destination. Subsequently, the method 400 proceeds to step 430, where the controller obtains loading parameters for links in the candidate paths. Next, the method 400 proceeds to step 440, where the controller estimates network costs (e.g., direct, indirect, or otherwise) associated with transporting the service flow over the each of the candidate paths based on the loading parameters. In some embodiments, estimating the network costs may utilize cost functions stored in a resource cost database. The cost functions may be formed by analyzing historical network information to identify correlations between costs (e.g., interference, reductions in spectral efficiency, etc.) and network loading (e.g., throughput, etc.). Thereafter, the method 400 proceeds to step 450, where the controller assigns the candidate path having the lowest outage probability to transport the service flow. In some embodiments, the service request may be rejected altogether if all outage probabilities exceed a threshold.

Network costs can also correspond to a price paid to use or reserve a network resource. More specifically, next generation networks may provision network resources using a marketplace architecture in which virtual or physical resources are offered for sale at prices that vary with supply and demand. For example, pricing for wireless spectrum bandwidth (virtual or otherwise) may be adjusted based on resource availability (or on average spectral-efficiency-per-resource-unit). Accordingly, the price for each additional resource unit may increase as network loading increases, e.g., as resource availability decreases. In some embodiments, resource pricing may be negotiated between the user and the network operator, or by an intermediary, e.g., a telephone network service provider, etc. In other embodiments, resource pricing may be set according to a function/formula.

Figure 5:
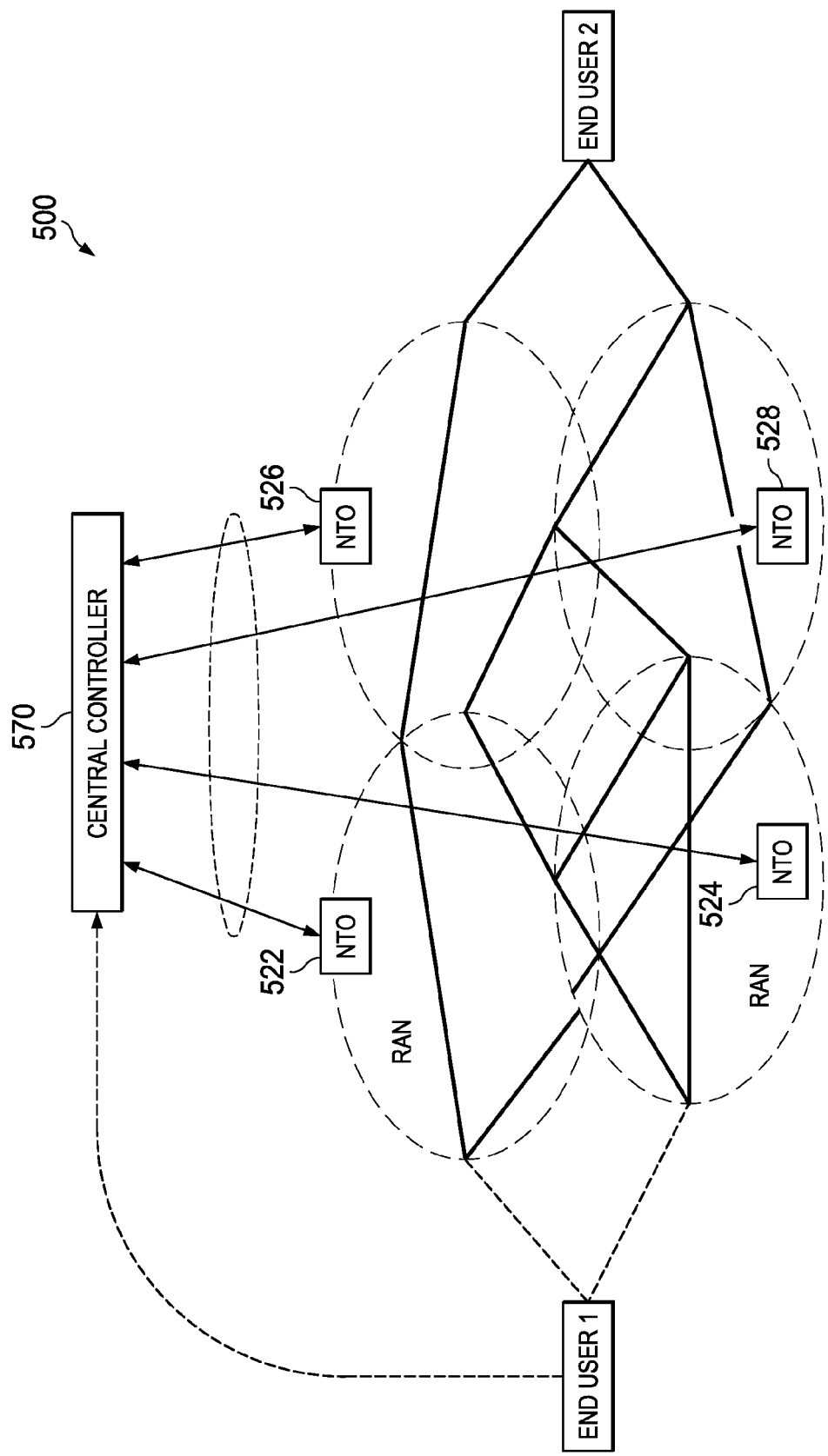
FIG. 5 illustrates a diagram of yet another embodiment network.

FIG. 5 illustrates an embodiment network 500 for provision network resources using a marketplace architecture. As shown, the network 500 includes a central controller 570 configured to purchase resources from network operators (NTOs) 522-528. The NTOs 522-528 may operate different types of networks, or different domains within the same network. As an example, the NTOs 522, 524 may operate radio access networks (RANs), while the NTOs 526, 528 may operate wireline networks, e.g., the NTOs 526, 528 may be internet service providers (ISPs). The controller 570 may negotiate resource pricing with the NTOs 522-528 on part of users/subscribers. Alternatively, the pricing may fluctuate based on actual or estimated resource availability, e.g., price increases as resources become more scarce. Resource pricing may be calculated/estimated using, inter alia, current loading parameters of the network 500 in accordance with a cost-function. The cost function can be developed by analyzing historical network information to identify correlations between resource availability (e.g., spectral efficiency, etc.) and loading in the network 500. Techniques for developing cost functions and resource cost databases are described in U.S. patent application Ser. No. 14/107,946 entitled "Service Provisioning Using Abstracted Network Resource Requirements" filed on Dec. 16, 2013 and U.S. patent application Ser. No. 14/106,531 entitled "Methods and Systems for Admission Control and Resource Availability Prediction Considering User Equipment (UE) Mobility" filed on Dec. 13, 2013, both of which are incorporated herein by reference as if reproduced in their entireties.

Aspects of this disclosure provide methods for predicting network costs during path selection and/or user admission. FIG. 6 illustrates an embodiment method 600 for estimating resource pricing during admission/path-selection, as might be performed by a controller. As shown, the method 600 begins with step 610, where the controller receives a service request requesting resources for transporting a service flow to a destination. Thereafter, the method 600 proceeds to step 620, where the controller identifies candidate paths for carrying the service flow to the destination. Subsequently, the method 600 proceeds to step 630, where the controller obtains loading parameters for links in the candidate paths. Next, the method 600 proceeds to step 640, where the controller estimates or determines resource pricing for transporting the service flow over each of the candidate paths based on the loading parameters. In some embodiments, price components may be estimated for each link in the path, and then summed to determine the resource pricing for the path. In some embodiments, the controller may estimate the pricing based on loading information provided by the NTOs. In other embodiments, the controller may determine the pricing by negotiating with the NTOs. Thereafter, the method 600 proceeds to step 650, where the controller assigns the candidate path having the lowest price to transport the service flow. In some embodiments, the service request may be rejected altogether if all prices exceed a threshold.

All else being equal, links having higher load variations typically exhibit a higher probability of outage than links having lower load variations. When there are alternative links/paths to be chosen, the cost of adding a user should be increased when the mean load is higher to discourage users/service providers from using highly loaded paths during load balancing. During path selection and/or admission control, the overall cost of multiple paths is searched and the best path is selected. The cost of each path may be a function of the cost of each link in that path. An embodiment represents the cost of a link such that overall cost is additive, but still allows the best path to be chosen from the viewpoint of the network.

An embodiment provides a method to represent the impact of load variation on service outage when admitting or routing a flow through a path consisting of multiple links. When a data flow is to be added to a link, if the load variation is high, the probability of outage increases. Thus, if the flow is added considering only the increase of mean load, the chance of outage would increase and an embodiment provides a method to represent this outage.

An embodiment provides a method for a central entity to perform load balancing across a network. The cost of adding a service flow is modeled as a function of current load and load variation using a convex, increasing function, the parameters of which can be changed based on the load variation and other operator needs such as competitiveness or to draw a higher income. When there are alternative links/paths to be chosen, the cost of adding a user is increased when the mean load is higher to discourage users/service providers from using highly loaded paths to do load balancing.

Embodiment cost functions encourage complete shut-off of a radio node if the user flows can be handled along different paths. An embodiment supports on-demand cost estimation as a function of demand/availability to enable pricing to be adjusted dynamically. Embodiments also may be used for user controlled path selection based on cost, as a central entity to perform admission and routing, load balancing and optimization of the network, and as a network congestion solution to avoid network congestion if demand-based charging is imposed.

Outage of a link can be modeled as a function of load parameters, e.g., load, loading variation. In some embodiments, loading variation is computed using short-term statistics. In another embodiment, loading variation is computed using long-term statistics. The load itself can be a function of the number of resources used or the power each of these resources used. It also can be a function of the characteristics of traffic flows that go through that link, for example, a total utility. The load also varies with the channel conditions of different traffic flows. In the simplest example, the load could be modeled as a mean and a standard variation, thereby allowing the probability of outage to be modeled as a function of loading on the link.

The probability of success of the path can be computed by multiplying the individual probabilities of success values for each link, which can be achieved using a logarithm or logarithmic function. In this manner, the probability of success can be used by a central entity for various provisioning activities, such as load balancing across a network, determining whether a certain node can be switched off, supporting on-demand pricing for users, to determine the impact a given service will have on network performance, etc.

An embodiment method represents the current loading of a link using a cost function that provides a higher system cost for accommodating a flow at higher loading compared to lower loading taking load variation into account to reduce outage. An embodiment method allows the network operator to increase or decrease charging dynamically (e.g., to address competitive situations), which can be used by the customers to select networks and paths. An embodiment enables a method for different service providers to use the system independently while indirectly balancing the load and minimizing link outage, and allows for automated congestion control if the cost based charging or admission is implemented. An embodiment method allows an operator to charge customers taking resource cost into account.

Network controllers may maintain a database to keep load-cost dependencies. In cost based control schemes, the cost of each link is evaluated by mapping an expected resource usage to a cost, which can be a factor of many other parameters and may change dynamically.

Figure 7:
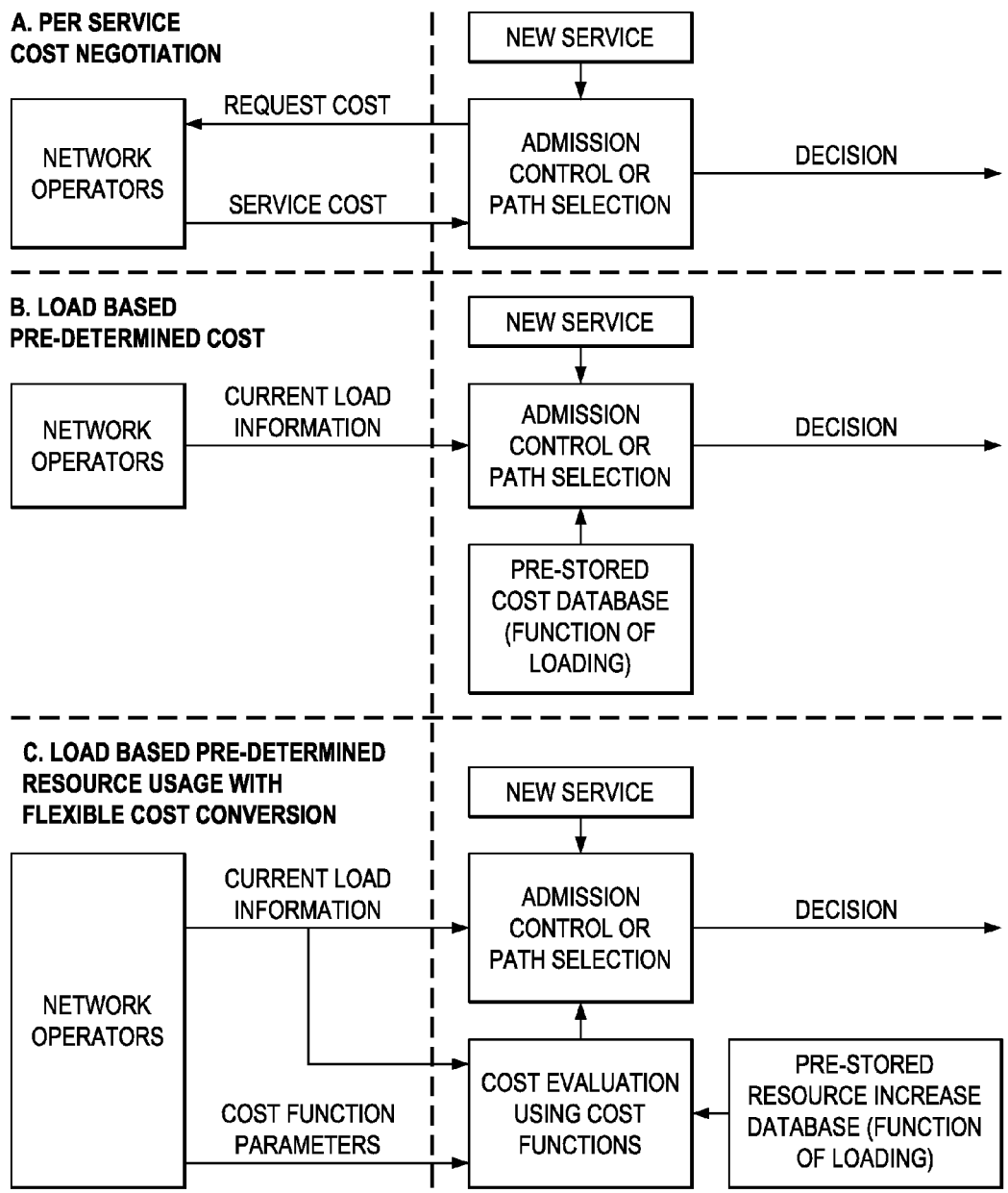
FIG. 7 illustrates a diagram of an embodiment cost based model.
Figure 8:
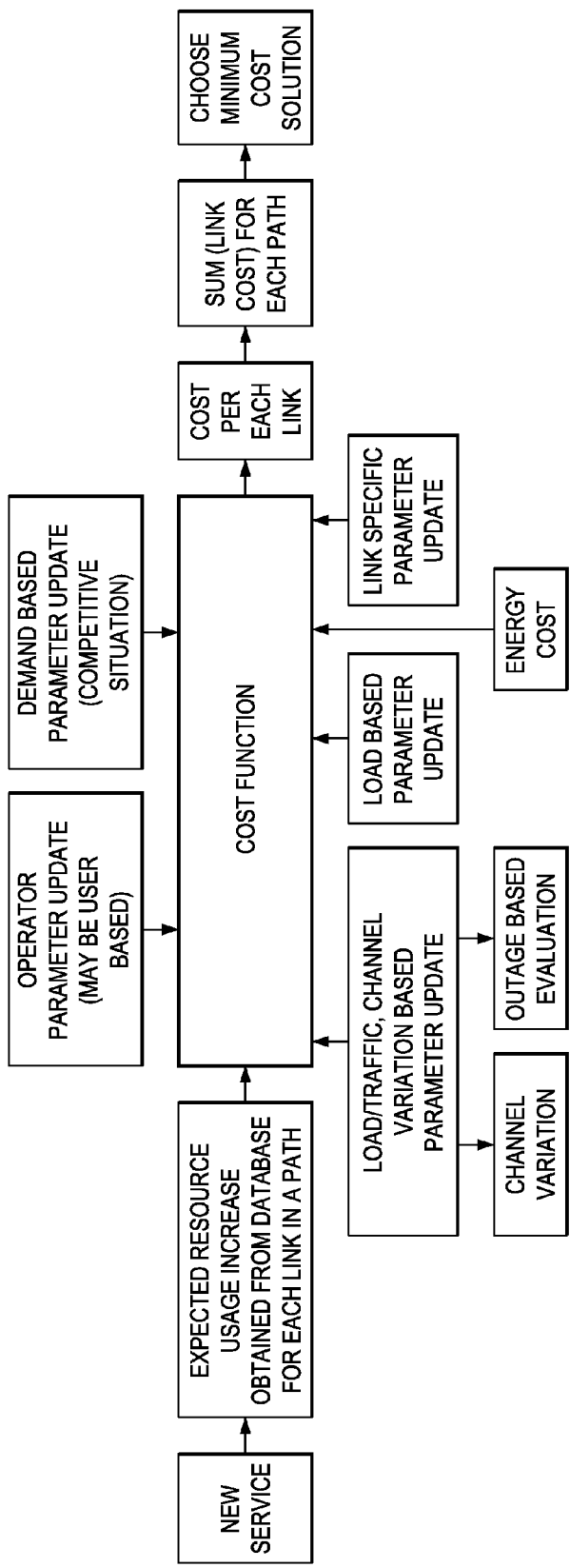
FIG. 8 illustrates a diagram of an embodiment cost function.

FIG. 7 illustrates a cost based model overview. The B and C cost based schemes use a cost function to change the resource usage to network cost. FIG. 8 illustrates a cost function usage overview. Objectives of a cost function may include reducing network congestion call blocking in a manner that permits distributed provisioning (e.g., admission control and path selection). This can be achieved by conservatively admitting or making routing changes when the load of a link changes, e.g., the cost of a link increases with the load. The cost function may also reflect that higher demand increases resource costs on a link. When the variation of load in a link is large (traffic variability) and/or the variation of link capacity (e.g. for a wireless link, the kink capacity changes with time), there is a higher probability of outage. At that time the admission control or path selection can be done more conservatively and the cost function can reflect that. In addition, the network operator may be able to dynamically change the cost function parameters for competitive purposes and as per the dynamic per user based requirements. The cost function can also take into account the energy cost of maintaining a link. For example, when a node or transmission link is completely shut down, there is energy saving and a cost proportional to energy usage can be included. The cost function can also be used for dynamic cost based charging. In this case, the cost function could reflect the actual cost of a link to the user so that the user can make a decision to use or not to use a given link depending on the user's needs.

If loads are added directly (or a linear function) to determine the total cost of the path, the cost of the almost loaded link is compensated by the lightly loaded link. An embodiment function is used to map all the link loads and load variations to a single cost value. The qualities of the function include (1) when load of one link increases, the total load should increase, (2) when load of even one link exceeds the capacity the total cost should exceed the cost threshold, and (3) the increase in cost should be higher at a higher load than a smaller load (if the variance remains the same). The Cost_per_link=f(load, variation). The Cost per link=Load (or a linear function). The Cost of path=sum (Cost per link). The cost of the almost loaded link is compensated by the lightly loaded link. Therefore, the function can be modified by a cost function such that the cost increases with the likelihood of outage in the link. Then the cost of using the same amount of resources should be higher at higher loads than the smaller loads.

Figure 9:
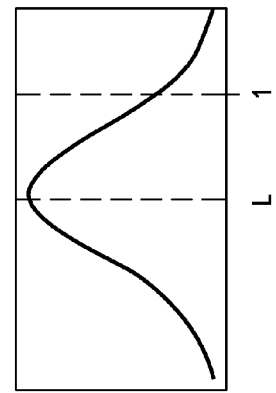
FIG. 9 illustrates a graph depicting load variation.
Figure 10:
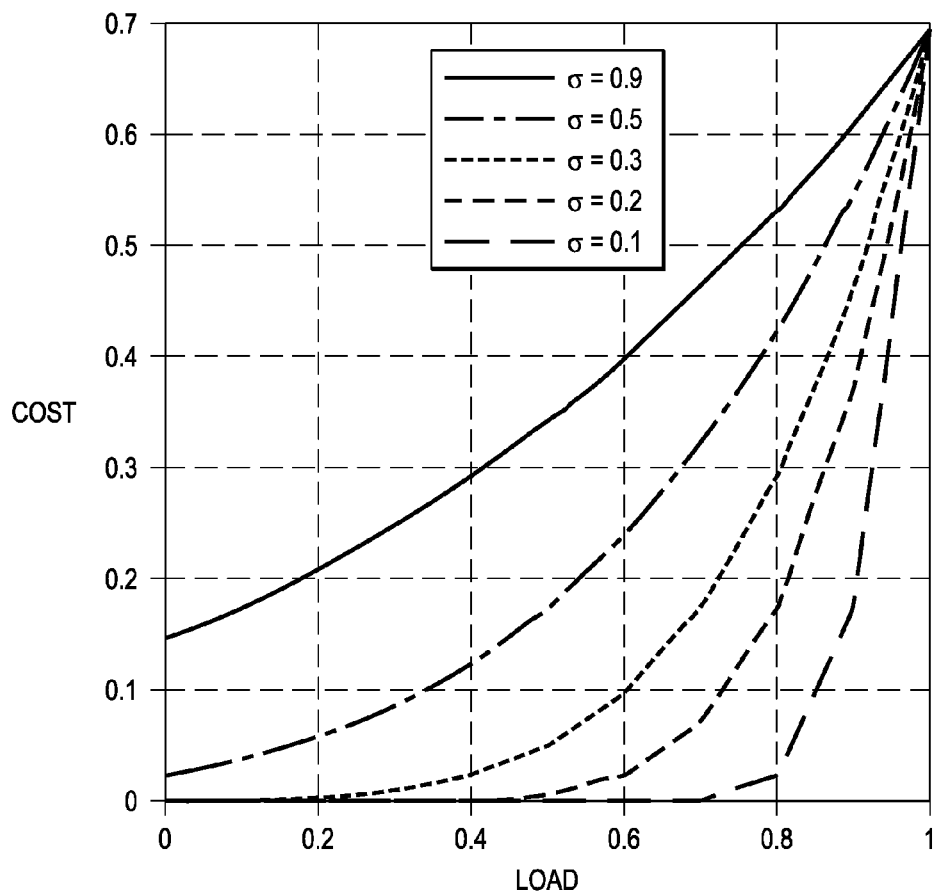
FIG. 10 illustrates a diagram of another embodiment cost function.
Figure 11:
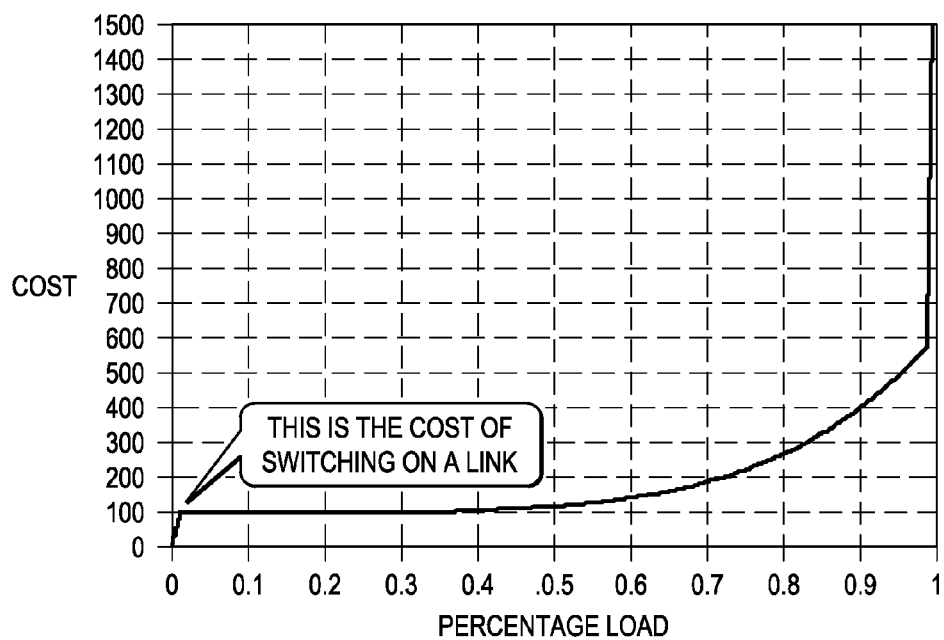
FIG. 11 illustrates a diagram of yet another embodiment cost function.

FIG. 9 illustrates a load variation plot. If it is assumed that a current load variation behaves as a normal distribution, with a mean $L_i$ and standard deviation $\sigma_i$, then the probability of outage can be expressed as follows: $Poi=0.5-0.5*erf(1-L_i)/(\sigma_i*sqrt(2))$. Cost can be taken as inversely proportional to the probability of success, and let $cost=log(1/Ps)$. This cost function is shown in FIG. 10, wherein the curves progress downward from a $\sigma 0.9$ as the uppermost curve, down to a $\sigma 0.1$ as the lowermost curve. FIG. 11 illustrates an embodiment cost function, and shows how it can be used for admission control and routing. The following parameters were used for the cost function: function cost=f_cost_func(link, load); power_on_cost=100; max_load=1; k=400; % value operator uses to compete with other operators in the area; n=5; if load<=1, then cost=500*load^n, end; if load>=1, then cost=cost+1500, end; if load>0, then cost=cost+power_on_cost, end; end.

Figure 12:
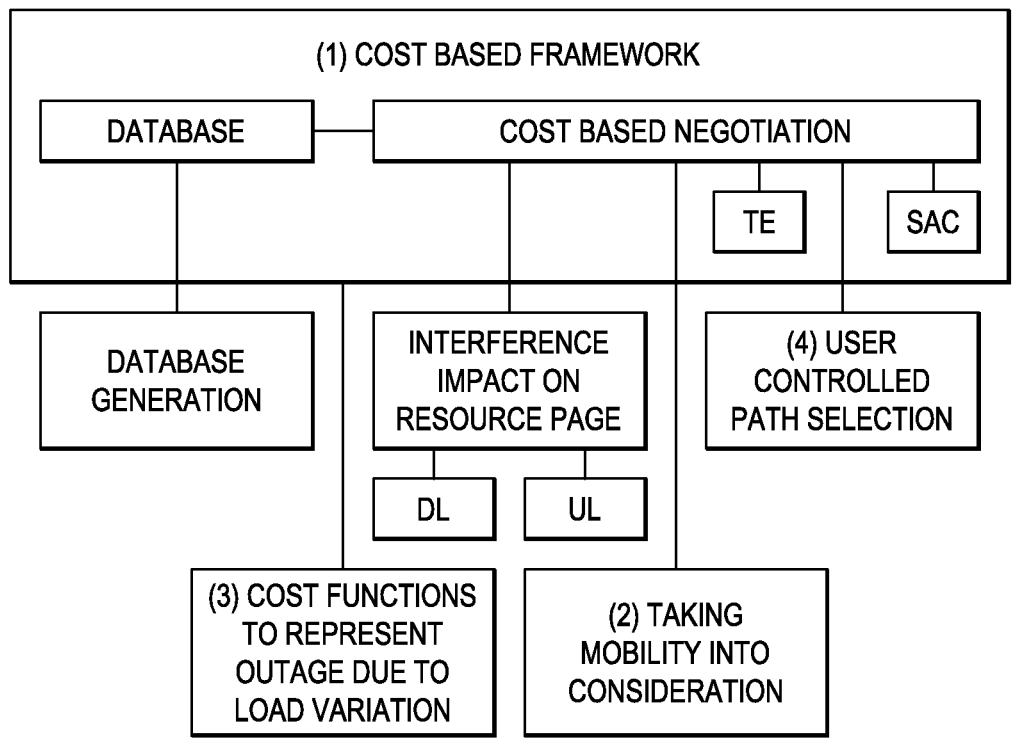
FIG. 12 illustrates a diagram of embodiment cost based submissions.

In this scheme, n is changed according to the variation of the load. Operator's prize increase or demand increase can be modeled by a simple proportional parameter. This may also be changed only in a high loading area. FIG. 12 illustrates different cost based submissions.

Figure 13:
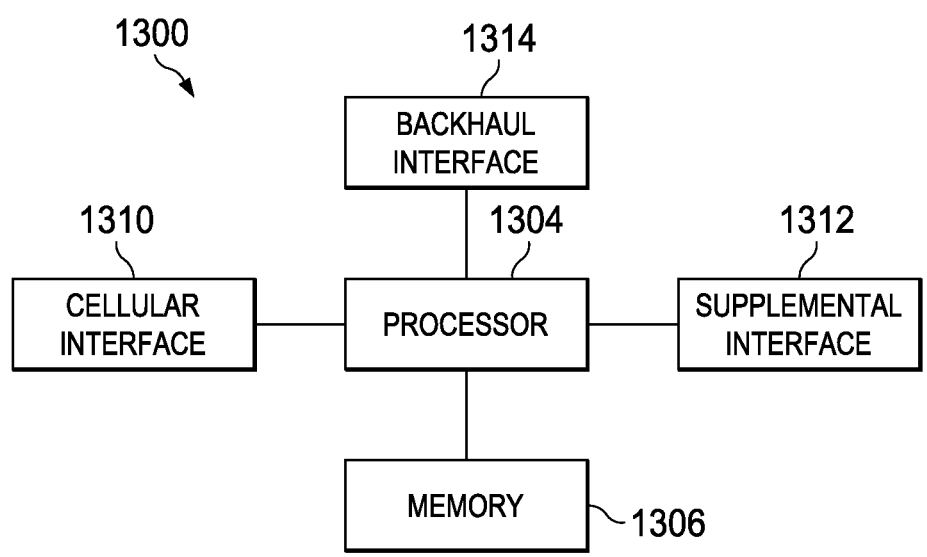
FIG. 13 illustrates a diagram of an embodiment network device.

FIG. 13 illustrates a block diagram of an embodiment of a network device 1300, which may be equivalent to one or more devices (e.g., controllers, etc.) discussed above. The network device 1300 may include a processor 1304, a memory 1306, a cellular interface 1310, a supplemental interface 1312, and a backhaul interface 1314, which may (or may not) be arranged as shown in FIG. 13. The processor 1304 may be any component capable of performing computations and/or other processing related tasks, and the memory 1306 may be any component capable of storing programming and/or instructions for the processor 1304. The cellular interface 1310 may be any component or collection of components that allows the network device 1300 to communicate using a cellular signal, and may be used to receive and/or transmit information over a cellular connection of a cellular network. The supplemental interface 1312 may be any component or collection of components that allows the network device 1300 to communicate data or control information via a supplemental protocol. For instance, the supplemental interface 1312 may be a non-cellular wireless interface for communicating in accordance with a Wireless-Fidelity (Wi-Fi) or Bluetooth protocol. Alternatively, the supplemental interface 1312 may be a wireline interface. The backhaul interface 1314 may be optionally included in the network device 1300, and may comprise any component or collection of components that allows the network device 1300 to communicate with another device via a backhaul network.

Figure 14:
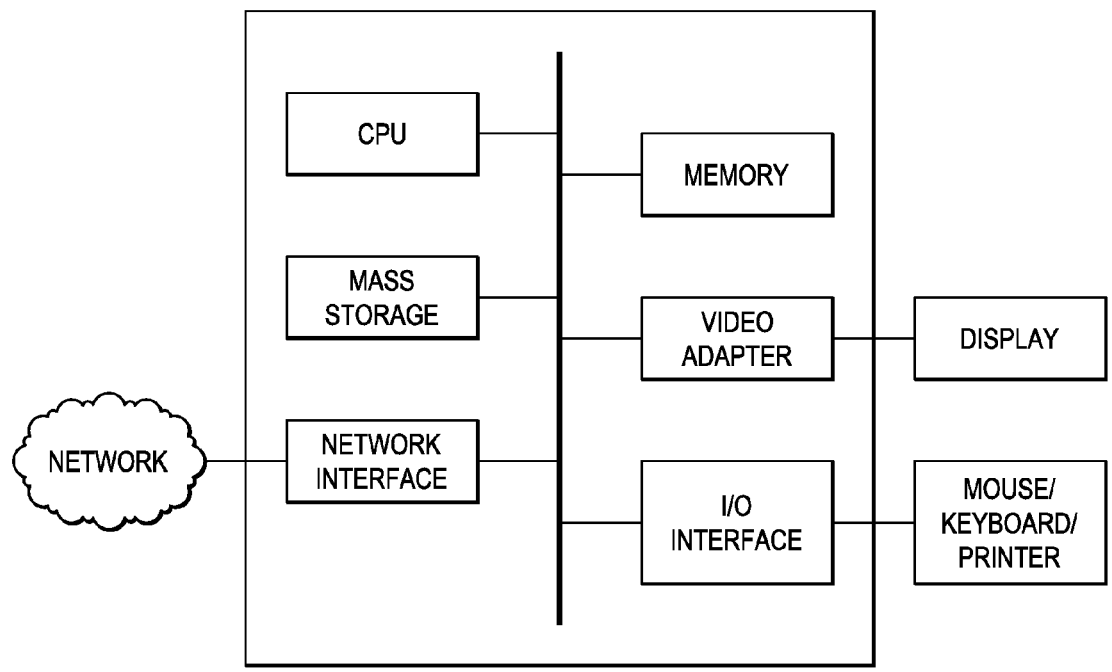
FIG. 14 illustrates a computing platform that may be used for implementing, for example, the devices and methods described herein, in accordance with an embodiment.

FIG. 14 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for resource provisioning, the method comprising:
identifying, by a controller, one or more candidate wireless paths for carrying a service flow to a destination, the one or more candidate wireless paths including at least a first wireless path comprising a first set of links connected in series;
obtaining load characteristics associated with the first set of links;
determining a first cost for carrying the service flow over the first wireless path in accordance with the load characteristics associated with the first set of links; and
prompting establishment of the first wireless path when the first cost for carrying the service flow over the first wireless path is less than a threshold, wherein the first cost includes a component corresponding to a probability that one or more links in the first set of links will experience an outage if the service flow is carried over the first wireless path.

2. The method of claim 1, wherein the load characteristics include a load on each link in the first set of links.

3. The method of claim 1, wherein the load characteristics include a load variation on each link in the first set of links.

4. The method of claim 1,
wherein determining the first cost comprises computing a component of the first cost in accordance with the following formula: cost=$\Sigma_{i=1}^{n} -\log(1-P_{oi})$, where $P_{oi}$ is the probability of outage of an $i^{th}$ link in the first set of links, and n is the number of links in the first set of links.

5. The method of claim 1, wherein determining the first cost comprises:
computing a component of the first cost in accordance with the following formula: cost=$\log(1/P_s)$,
where $P_s$ is the probability of success over the first wireless path.

6. The method of claim 1, wherein determining the first cost comprises:
computing a component of the first cost in accordance with the following formula: cost=$\Sigma_{i=1}^{n} C(L_i, \sigma_i)$, where $C(L_i, \sigma_i)$ is the cost function for the first wireless path, $L_i$ is the mean load on an $i^{th}$ link in the first set of links, $\sigma_i$ is the load variation on an $i^{th}$ link in the first set of links, and n is the number of links in the first set of links.

7. The method of claim 1, wherein a component of the first cost corresponds to a total network cost for transporting the service flow over the first wireless path.

8. The method of claim 1, wherein the first set of links includes a first radio interface between a first transmitter and the destination.

9. The method of claim 8, wherein a component of the first cost corresponds to interference experienced on a second radio interface as a result of communicating the service flow over the first radio interface.

10. The method of claim 1, wherein the first cost consists of the component corresponding to the probability that one or more links in the first set of links will experience an outage if the service flow is carried over the first wireless path.

11. A method for resource provisioning, the method comprising:
identifying, by a controller, one or more candidate paths for carrying a service flow to a destination, the one or more candidate paths including at least a first path comprising a first set of links connected in series;
obtaining load characteristics associated with the first set of links;
determining a first cost for carrying the service flow over the first path in accordance with the load characteristics associated with the first set of links, wherein determining the first cost comprises computing the first cost in accordance with the following formula: cost=$\Sigma_{i=1}^{n} C(L_i, \sigma_i, L_{i1}, \sigma_{i1}, L_{i2}, \sigma_{i2}, .. L_{im}, \sigma_{im},)$, where $C(L_i, \sigma_i)$ is the cost function for the first path, $L_i$ is a loading parameter on an $i^{th}$ link in the first set of links, $\sigma_i$ is the load variation on an $i^{th}$ link in the first set of links, $L_{ij}$ is a loading parameter of the $j^{th}$ neighbor of the $i^{th}$ link, $\sigma_{ij}$ is the load variation of the $j^{th}$ neighbor of the $i^{th}$ link, n is the number of links in the first set of links, m is the number of neighbors for the $i^{th}$ link; and
prompting establishment of the first path when the first cost is less than a threshold.

12. The method of claim 11, wherein $L_i$ is a mean load on the $i^{th}$ link in the first set of links, and $L_{ij}$ is a mean load on the $j^{th}$ neighbor of the $i^{th}$ link.

13. An apparatus comprising:
a processor; and
a non-transitory computer readable storage medium storing programming for execution by the processor, the programming including instructions to:
identify one or more candidate wireless paths for carrying a service flow to a destination, the one or more candidate wireless paths including at least a first wireless path comprising a first set of links connected in series;
obtain load characteristics associated with the first set of links;
determine a first cost for carrying the service flow over the first wireless path in accordance with the load characteristics associated with the first set of links; and
prompt establishment of the first wireless path when the first cost for carrying the service flow over the first wireless path is less than a threshold, wherein the first wireless path includes at least one radio interface, and wherein a component of the first cost comprises an amount of interference that would be experienced on one or more neighboring wireless links as a result of communicating the service flow over the at least one radio interface.

14. The apparatus of claim 13, wherein the load characteristics include a load on each link in the first set of links.

15. The apparatus of claim 13, wherein the load characteristics include a load variation on each link in the first set of links.

16. The apparatus of claim 13, wherein the instructions to determine the first cost include instructions to:
compute a component of the first cost in accordance with the following formula: cost=$\Sigma_{i=1}^{n} C(L_i, \sigma_i, L_{i1}, \sigma_{i1}, L_{i2}, \sigma_{i2}, .. L_{im}, \sigma_{im},)$, where $C(L_i, \sigma_i)$ is the cost function for the first wireless path, $L_i$ is a loading parameter on an $i^{th}$ link in the first set of links, $\sigma_i$ is the load variation on an $i^{th}$ link in the first set of links, $L_{ij}$ is a loading parameter of the $j^{th}$ neighbor of the $i^{th}$ link, $\sigma_{ij}$ is the load variation of the $j^{th}$ neighbor of the $i^{th}$ link, n is the number of links in the first set of links, m is the number of neighbors for the $i^{th}$ link.

17. The apparatus of claim 16, wherein $L_i$ is a mean load on the $i^{th}$ link in the first set of links, and $L_{ij}$ is a mean load on the $j^{th}$ neighbor of the $i^{th}$ link.

18. The apparatus of claim 13, wherein the first cost consists of the component corresponding to the amount of interference that would be experienced on one or more neighboring wireless links as a result of communicating the service flow over the at least one radio interface.

19. An apparatus comprising:
a processor; and
a non-transitory computer readable storage medium storing programming for execution by the processor, the programming including instructions to:
identify one or more candidate wireless paths for carrying a service flow to a destination, the one or more candidate wireless paths including at least a first wireless path comprising a first set of links connected in series;
obtain load characteristics associated with the first set of links;
determine a first cost for carrying the service flow over the first wireless path in accordance with the load characteristics associated with the first set of links; and
prompt establishment of the first wireless path when the first cost for carrying the service flow over the first wireless path is less than a threshold, wherein a component of the first cost corresponds to a probability that one or more links in the first set of links will experience an outage if the service flow is carried over the first wireless path.

20. The apparatus of claim 19, wherein the instructions to determine the first cost include instructions to:
compute a component of the first cost in accordance with the following formula: $\text{cost}=\sum_{i=1}^{n}-\log(1-P_{oi})$, where $P_{oi}$ is the probability of outage of an $i^{th}$ link in the first set of links, and n is the number of links in the first set of links.

21. The apparatus of claim 19, wherein the instructions to determine the first cost include instructions to:
compute a component of the first cost in accordance with the following formula: $\text{cost}=\log(1/P_s)$,
where $P_s$ is the probability of success over the first wireless path.

22. The apparatus of claim 21, wherein determining the first cost comprises:
computing a component of the first cost in accordance with the following formula: $\text{cost}=\sum_{i=1}^{n} C(L_i, \sigma_i)$, where $C(L_i, \sigma_i)$ is the cost function for the first wireless path, $L_i$ is the mean load on an $i^{th}$ link in the first set of links, $\sigma_i$ is the load variation on an $i^{th}$ link in the first set of links, and n is the number of links in the first set of links.

23. The apparatus of claim 19, wherein the first cost consists of the component corresponding to the probability that one or more links in the first set of links will experience an outage if the service flow is carried over the first wireless path.

24. An apparatus comprising:
a processor; and
a non-transitory computer readable storage medium storing programming for execution by the processor, the programming including instructions to:
identify one or more candidate wireless paths for carrying a service flow to a destination, the one or more candidate wireless paths including at least a first wireless path comprising a first set of links connected in series;
obtain load characteristics associated with the first set of links;
determine a first cost for carrying the service flow over the first wireless path in accordance with the load characteristics associated with the first set of links; and
prompt establishment of the first wireless path when the first cost for carrying the service flow over the first wireless path is less than a threshold, wherein the first set of links includes a first radio interface between a first transmitter and the destination, and wherein a component of the first cost corresponds to interference experienced on a second radio interface as a result of communicating the service flow over the first radio interface.

25. A method for resource provisioning, the method comprising:
identifying, by a controller, one or more candidate wireless paths for carrying a service flow to a destination, the one or more candidate wireless paths including at least a first wireless path comprising a first set of links connected in series;
obtaining load characteristics associated with the first set of links;
determining a first cost for carrying the service flow over the first wireless path in accordance with the load characteristics associated with the first set of links; and
prompting establishment of the first wireless path when the first cost for carrying the service flow over the first wireless path is less than a threshold, wherein the first wireless path includes at least one radio interface, and wherein a component of the first cost corresponding to an amount of interference that would be experienced on one or more neighboring wireless links as a result of communicating the service flow over the at least one radio interface.

26. The method of claim 25, wherein the first cost consists of the component corresponding to the amount of interference that would be experienced on one or more neighboring wireless links as a result of communicating the service flow over the at least one radio interface.

27. The apparatus of claim 24, wherein the first cost consists of the component corresponding to the interference experienced on the second radio interface as a result of communicating the service flow over the first radio interface.

* * * * *